(12) United States Patent
Capoldi

(10) Patent No.: US 11,313,413 B2
(45) Date of Patent: Apr. 26, 2022

(54) ROLLING BEARING WITH SPRING BIASED THRUST RING, AND METHOD FOR MEASURING AN AXIAL CLEARANCE OF A ROLLING BEARING HAVING A THRUST RING

(71) Applicant: AKTIEBOLAGET SKF, Gothenburg (SE)

(72) Inventor: Bruno Capoldi, Charentenay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/101,290

(22) Filed: Nov. 23, 2020

(65) Prior Publication Data

US 2021/0246942 A1 Aug. 12, 2021

(30) Foreign Application Priority Data

Feb. 6, 2020 (DE) .......................... 102020201475.2

(51) Int. Cl.
*F16C 19/38* (2006.01)
*F16C 25/08* (2006.01)

(52) U.S. Cl.
CPC ............ *F16C 19/381* (2013.01); *F16C 25/08* (2013.01); *F16C 25/083* (2013.01); *F16C 2352/00* (2013.01); *F16C 2360/31* (2013.01)

(58) Field of Classification Search
CPC ........ F16C 19/381; F16C 25/06; F16C 25/08; F16C 25/083; F16C 19/56; F16C 19/546
See application file for complete search history.

(56) References Cited

U.S. PATENT DOCUMENTS

| 9,004,776 | B2 | 4/2015 | Capoldi et al. |
| 9,291,014 | B2 * | 3/2016 | Derrer ..................... F16C 19/49 |
| 9,422,923 | B2 * | 8/2016 | Frank ..................... F03D 80/70 |

FOREIGN PATENT DOCUMENTS

EP 2851575 B1 5/2016

\* cited by examiner

*Primary Examiner* — James Pilkington
(74) *Attorney, Agent, or Firm* — J-Tek Law PLLC; Scott T. Wakeman; Mark A. Ussai

(57) ABSTRACT

A rolling bearing includes a first ring, a second ring, at least one row of axial rolling elements arranged between the first ring and the second ring, and at least one thrust ring axially interposed between the axial rolling elements and the first ring and delimiting a raceway for the axial rolling elements. At least one spring system axially biases the thrust ring against the axial rolling elements and includes a piston housed in a through-hole of the first ring and a spring element pressing the piston against the thrust ring. The piston includes a threaded hole accessible from outside the first ring.

16 Claims, 3 Drawing Sheets

ROLLING BEARING WITH SPRING BIASED THRUST RING, AND METHOD FOR MEASURING AN AXIAL CLEARANCE OF A ROLLING BEARING HAVING A THRUST RING

CROSS-REFERENCE

This application claims priority to German patent application no. 10 2020 201 475.2 filed on Feb. 6, 2020, the contents of which are fully incorporated herein by reference.

TECHNOLOGICAL FIELD

The present disclosure is directed to a rolling element bearing having a thrust ring for removing an axial clearance from the bearing and, more specifically, toward a rolling element bearing having a thrust ring for removing an axial clearance which bearing also allows an initial axial clearance of the bearing to be measured and to a method of measure the initial axial clearance.

BACKGROUND

Large-diameter rolling bearings may be used for example in tunnel boring machines, mining extraction machines and wind turbines. Without limitation, large diameter bearings are often bearings that have a diameter of one meter or more.

A large-diameter rolling bearing comprises two concentric inner and outer rings, and at least one row of rolling elements, such as rollers, arranged between the rings. The rolling bearing may also include a thrust ring urged against the rollers by spring systems to remove an axial clearance which may be present in the rolling bearing assembly, for example, to limit vibration impact during operation. Such a system is known from EP 2851575 B1 (a family member of U.S. Pat. No. 9,004,776 B2).

However, with the spring systems disclosed in this patent, it is not possible to measure the initial axial clearance of the bearing without dismounting rings since this clearance is cancelled by the spring systems.

SUMMARY

An aspect of the present disclosure is to overcome this drawback.

The disclosure relates to a rolling bearing comprising a first ring, a second ring, at least one row of axial rolling elements arranged between the rings, at least one thrust ring axially interposed between the axial rolling elements and the first ring and delimiting a raceway for the axial rolling elements, and at least one spring system to axially push the thrust ring against the axial rolling elements.

The spring system is provided with a pushing member housed in a through-hole of the first ring, and with at least one spring element exerting an axial force urging the pushing member against the thrust ring.

According to another aspect, the pushing member of the spring system is provided with a threaded hole accessible from the outside of the rolling bearing.

The terms "axial rolling elements" is understood to mean rolling elements adapted to accommodate axial loads.

Thanks to the invention, it is possible to measure the axial clearance inside the rolling bearing without pressure between the axial rolling elements and the thrust ring by axial compressing the spring element of the spring system(s).

A screw engaging inside the threaded hole of the pushing member may be used to axially compress the spring element and to create axial clearance between the axial rolling elements and the raceway of the thrust ring. Therefore, the initial axial clearance of the bearing can be measured without dismounting rings.

Preferably, the through-hole of the first ring extends axially from a frontal (axial) surface of the first ring.

In one embodiment, the pushing member of the spring system may comprise a piston that axially contacts the thrust ring, and a rod around which is mounted on the spring element and provided with the threaded hole.

In one embodiment, the rolling bearing further comprises at least one row of radial rolling elements arranged between the first and second rings. The second ring may comprise a protruding nose engaged into an annular groove of the first ring and provided with an axial surface delimiting a raceway forming the radial rolling elements. The terms "radial rolling elements" is understood to mean rolling elements adapted to accommodate radial loads.

In one embodiment, the rolling bearing comprises at least two rows of axial rolling elements that are disposed axially on each side of the nose of the second ring.

The disclosure also relates to a method for measuring an axial clearance of a rolling bearing as previously defined, the method comprising the step of:

a) compressing said spring element of said spring system by using a screw engaged into the threaded hole of the pushing member until the thrust ring axially bears against the first ring to create an axial clearance between the thrust ring and said axial rolling elements, and b) measuring the value of the created axial clearance.

The method may further comprise after step b), the step of removing the screw from the threaded hole of the pushing member.

BRIEF DESCRIPTION OF THE DRAWINGS

The present invention and its advantages will be better understood by studying the detailed description of specific embodiments given by way of non-limiting examples and illustrated by the appended drawings of which.

DETAILED DESCRIPTION

Figure 1:
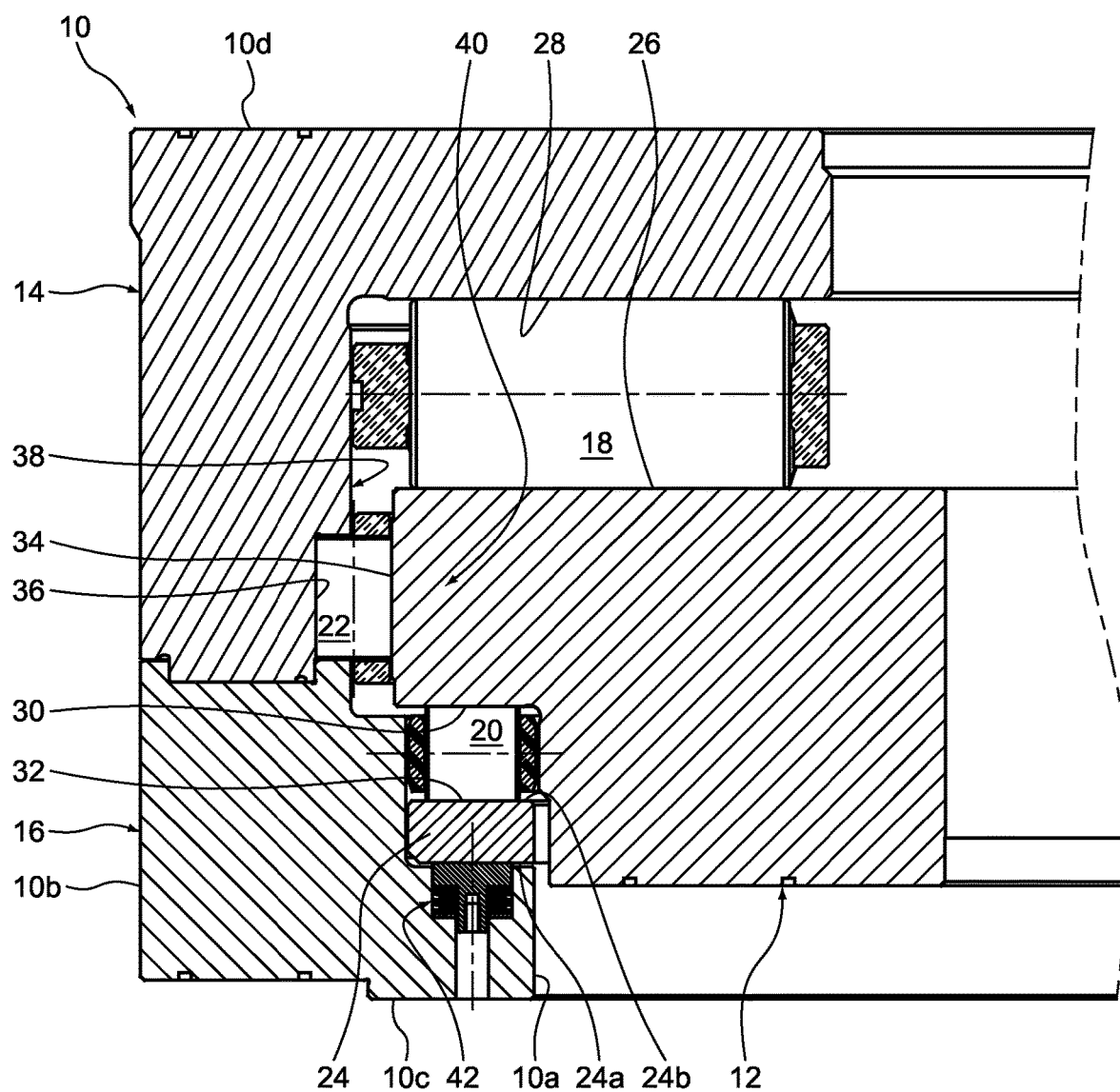
FIG. 1 is a partial cross-section of a rolling bearing according to a first embodiment of the invention.

The rolling bearing as illustrated on FIG. 1 is a large-diameter rolling bearing comprising a first ring 10 and a second ring 12. In the illustrated example, the first ring 10 is the outer ring and the second ring 12 is the inner ring. In this example, the inner ring 12 is configured to rotate and the outer ring 10 is configured to be fixed. The rolling bearing may for example be used in a tunnel boring machine, a wind turbine or any other applications using a large diameter rolling bearing.

The outer and inner rings 10, 12 are concentric and extend axially along the bearing rotation axis (not shown) which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described hereinafter, the rolling bearing also comprises a thrust ring 24 axially mounted between the row of axial rollers 20 and the outer ring 10. Such a thrust ring 24 may sometimes be referred to as an "elastic ring".

The rollers 18, 20, 22 of one row are identical to one another. Each roller 18, 20, 22 comprises a cylindrical outer rolling surface. The axis of rotation of each roller 22 is parallel to the axis of rotation the bearing and perpendicular to the axes of each of the rollers 18, 20. In the illustrated example, the axial length of the rollers 18 is larger than the axial lengths of the rollers 20. Alternatively, the axial length of the rollers 18 may be smaller than, or may be equal to, the axial length of the rollers 20.

The rollers 18 are arranged axially between annular radial raceways 26, 28 respectively formed on the inner and outer rings 12, 10. The raceways 26, 28 face each other in the axial direction.

The rollers 20 are arranged axially between annular radial raceways 30, 32 respectively formed on the inner ring 12 and the thrust ring 24. The raceways 30, 32 axially face each other. The rows of rollers 18, 20 are spaced apart from each other in the axial direction.

The rollers 22 are arranged radially between annular (cylindrical) axial raceways 34, 36 respectively formed on the inner and outer rings 12, 10. The raceways 34, 36 face each other in the radial direction. The row of rollers 22 is offset radially outward with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10a from which the groove 38 is formed. The outer ring 10 also comprises an outer cylindrical surface 10b which is radially opposite to the bore 10a. The outer ring 10 further comprises two opposite radial frontal faces or surfaces 10c, 10d which axially delimit the bore 10a and the outer surface 10b of the ring. The frontal surfaces 10c, 10d delimits the axial thickness of the outer ring 10.

The inner ring 12 comprises an annular protruding nose 40 engaging into the annular groove 38 of the outer ring. The nose 40 extends radially outwards. The protruding nose 40 protrudes radially from an outer cylindrical surface of the inner ring.

The rows of rollers 18, 20 are arranged axially between the nose 40 of the inner ring and the groove 38 of the outer ring. The rows of rollers 18, 20 are disposed on each side of the nose 40 of the inner ring. The radial raceways 26, 30 are located on the nose 40. The radial raceway 28, 32 is located on the groove 38 of the outer ring. The radial raceway 32 is located on the thrust ring 24.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. An axial bottom of the groove 38 delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38.

As previously mentioned, the thrust ring 24 is axially mounted between the axial rollers 20 and the outer ring 10. The thrust ring 24 is axially interposed between the axial rollers 20 and the outer ring 10. The thrust ring 24 is mounted around the inner ring 12. The thrust ring 24 is mounted inside the groove 38 of the outer ring. The thrust ring 24 is freely movable in translation with regard to the outer and inner rings 10, 12. The thrust ring 24 is provided with two opposite radial frontal (axially facing) surfaces 24a, 24b which axially delimit the thickness of the ring. The frontal surface 24b of the thrust ring delimits the radial raceway 32. The radial raceway 32 is in contact with the outer rolling surface of each roller 20. The frontal surface 24a of the thrust ring remains axially spaced apart from the outer ring 10, notably from a radial shoulder 38a of the groove 38.

The rolling bearing further comprises a plurality of spring systems 42 to axially push the thrust ring 24 against the axial rollers 20. The spring systems 42 are mounted on the outer ring 10. The spring systems 42 are distributed around the circumference of the thrust ring 24. Preferably, the spring systems 42 are equally angularly spaced with respect to each other. The spring systems 42 are identical to each other. Since the spring systems 42 are identical, only one of them will be described here.

Figure 2:
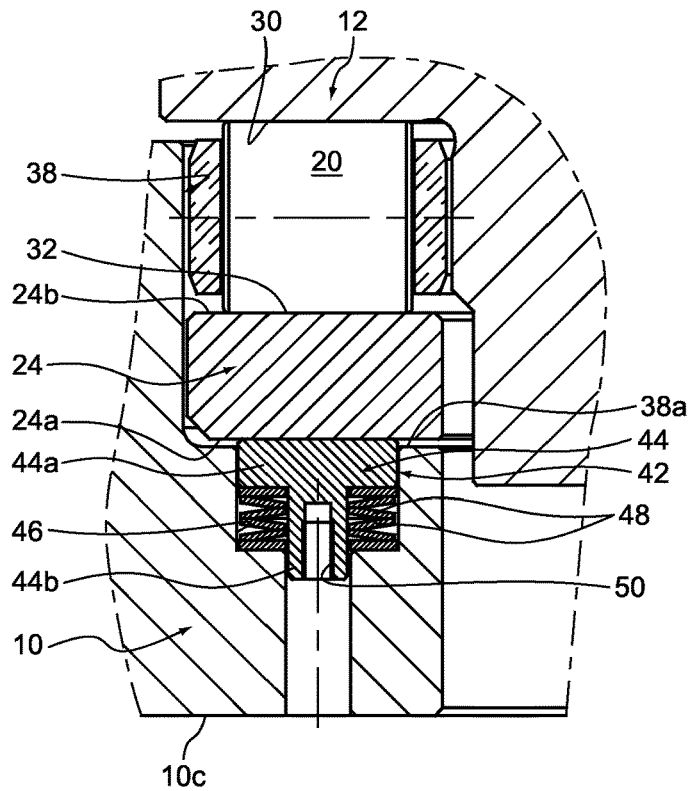
FIG. 2 is a detail view of FIG. 1.

As shown more clearly on FIG. 2, the spring system 42 is provided with a pushing member 44 engaged inside a through-hole 46 formed on the outer ring 10. The pushing member 44 comes into axial contact with the thrust ring 24. The pushing member 44 comprises a piston 44a axially contacting against the thrust ring 24 on the side axially opposite to the rollers 20. The piston 44a axially contacts against the frontal surface 24a of the thrust ring. The pushing member 44 also comprises a rod 44b extending axially the piston 44a on the side axially opposite to the rollers 20. Preferably, the pushing member 44 is made in one part.

The through-hole 46 of the outer ring extends axially. The through-hole 46 extends axially from the frontal surface 10b of the outer ring and opens on the groove 38. The through-hole 46 axially faces the thrust ring 24. The pushing member 44 axially protrudes with respect to the radial shoulder 38a of the groove of the outer ring.

In the illustrated example, the through-hole 46 comprises a first portion (not referenced) extending from the frontal surface 10b of the outer ring, and a second portion (not referenced) extending axially from the first portion, opening on the groove 38 of the outer ring and having a larger diameter. The piston 44a of the pushing member 44 is mounted inside the second portion of the through-hole 46. The rod 44b extends inside both the second and first portions of the through-hole 46.

The spring system 42 is also provided with elastic washers 48 (a first biasing means) exerting an axial pre-stressing permanent force on the pushing member 44 so as to ensure an axial contact between the thrust ring 24 and the rollers 24. The washers 48 are mounted around the rod 44b of the pushing member 44. The washers 48 are axially disposed between the piston 44a of the pushing member and the radial shoulder provided between the first and second portions of the through-hole 46.

In the illustrated example, the elastic washers 48 are Belleville washers. Alternatively, it could be possible to provide other pre-stressing element to exert a permanent axial force on the thrust ring 24, for example a compression spring. In the illustrated example, a first flat washer (not referenced) is axially interposed between the spring washers 48 and the outer ring 10, and a second flat washer (not referenced) is axially interposed between the spring washers 48 and the pushing member 44. Alternatively, it could be possible to not foresee such flat washers.

The pushing member 44 of the spring system is provided with a threaded hole 50 oriented axially towards the outside. The threaded hole 50 is oriented axially towards the frontal surface 10c of the outer ring. The threaded hole 50 is accessible from the outside of the rolling bearing. The threaded hole 50 is provided on the rod 44b of the pushing member. The threaded hole 50 extends axially. The threaded hole 50 extends axially from a frontal face of the rod 44b which is oriented axially towards the frontal surface 10c of the outer ring.

In use, the axial force exerted by each spring system 42 pushes the thrust ring 24 against the axial rollers 20 and removes any axial clearance which exists in the rolling bearing assembly. The thrust ring 24 is axially preloaded by the washers 48 of the spring systems. The initial axial clearance of the rolling bearing is removed. There is no possibility of axial relative displacements between the outer and inner rings 10, 12.

The threaded hole 50 of the pushing member 44 of each spring system is provided to allow for axial clearance measurement inside the rolling bearing.

Figure 3:
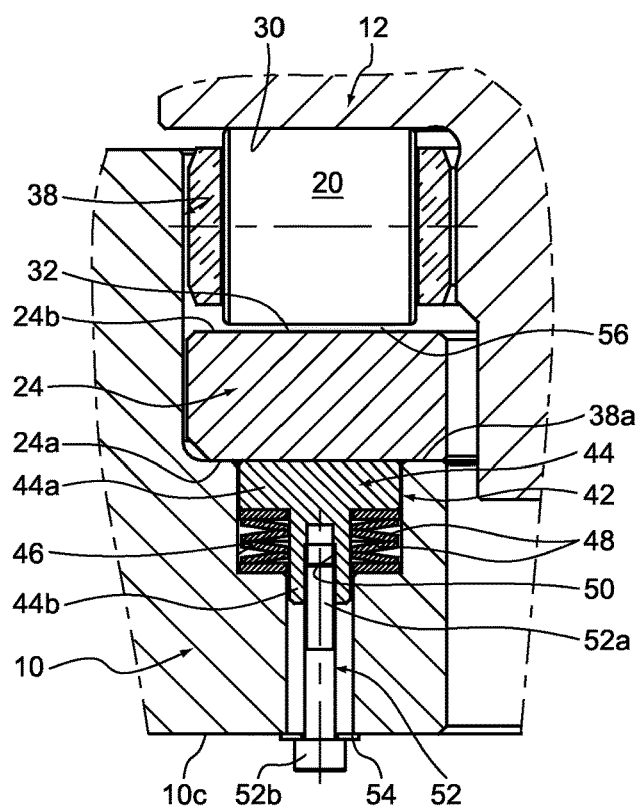
FIG. 3 is a detail view of the rolling bearing of FIG. 1 in a compressed state.
Figure 4:
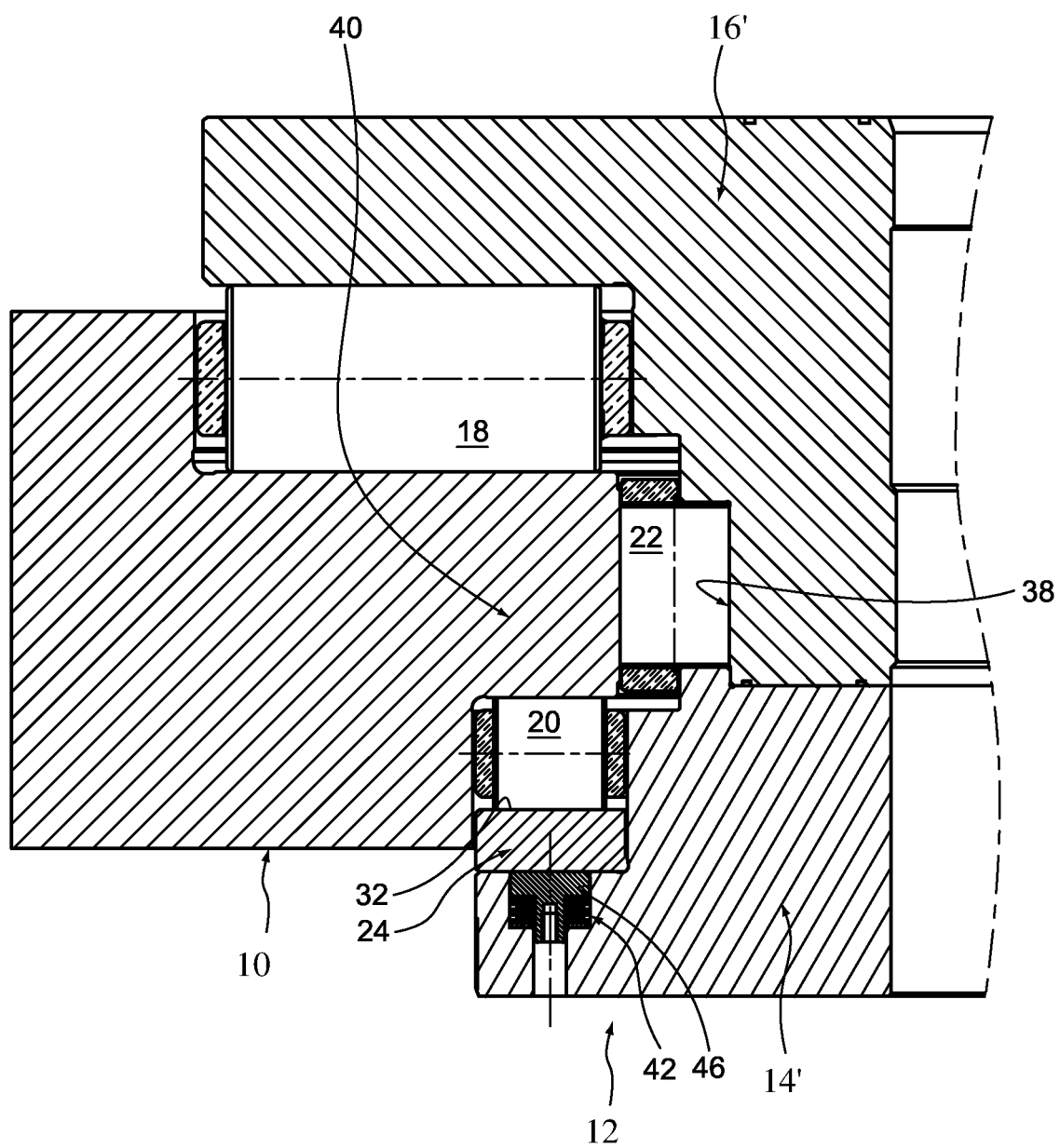
FIG. 4 is a partial cross-section of a rolling bearing according to a second embodiment of the invention.

As shown on FIG. 3, each spring system 42 further comprises a temporary screw 52 extending inside the associated through-hole 46 and engaged inside the threaded hole 50 provided on the associated pushing member 44 (the temporary screw 52 and the threaded hole together being a second biasing means). The screw 52 is provided with a threaded portion 52a engaged with the threaded hole 50. The screw 52 is provided with a screw head 52b axially located outside of the outer ring 10. The screw head 52b axially bears against the frontal surface 10c of the outer ring with interposition of a washer 54. Alternatively, the screw head 52b of the screw may be located inside the through-hole 46 against a radial shoulder of the hole.

The screw 52 is used to axially compress the washers 58 between the pushing member 44 of the spring system and the first ring 10 until the thrust ring 24 axially bears against the outer ring 10 as shown on FIG. 3. The frontal surface 24a of the thrust ring axially comes into contact with the outer ring 10. Here, in the illustrated example, the frontal surface 24a of the thrust ring axially comes into contact with the radial shoulder 38a of the groove of the outer ring.

An axial clearance 56 is created between the thrust ring 24 and the axial rollers 20. The axial clearance 56 is created between the raceway 32 of the thrust ring and the axial rollers 20.

Therefore, the value of the axial clearance inside the rolling bearing can be measured.

After measuring the axial clearance, the temporary screw 52 is disengaged from the threaded hole 50 of the pushing member 44. The axial force exerted by the washers 48, which axially urges the pushing member 24 against the thrust ring 24, pushes the thrust ring axially against the rollers 20. The axial clearance 56 is thus removed.

In the illustrated example, the thrust ring 24 is axially provided between the outer ring 10 and the row of axial rollers 20. Alternatively or in combination, the rolling bearing could be provided with a thrust ring disposed axially between the outer ring 10 and the row of axial rollers 18, and with associated spring systems similar to the one described for the thrust ring 24.

Otherwise, as previously mentioned, in this example, the first ring of the rolling bearing is the fixed outer ring 10 whereas the second ring is the rotative inner ring 12.

As an alternative, it could be possible to provide a reversed arrangement with the first ring forming the fixed inner ring 12 having a first part 14' and a second part 16' and the second ring forming the rotative outer ring 10. In this example, the thrust ring 24 is mounted axially between the row of axial rollers 20 and the first part 14' of the inner ring 12. Here, the spring systems 42 are mounted on the inner ring 12. The spring systems 42 are similar to the one previously described in the first example.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved roller bearings having thrust rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:
1. A rolling bearing comprising:
a first ring,
a second ring,
at least one row of axial rolling elements arranged between the first ring and the second ring, at least one thrust ring axially interposed between said axial rolling elements and the first ring and delimiting a first raceway for said axial rolling elements, and at least one spring system configured to axially bias the thrust ring against said axial rolling elements, said spring system including a piston supported by the first ring and a spring element pressing the piston against the thrust ring, wherein the piston includes a threaded hole accessible from outside the first ring.

2. The rolling bearing according to claim 1, wherein the piston is located in a through-hole of the first ring, the through hole extending axially from an axial surface of the first ring.

3. The rolling bearing according to claim 1, wherein the piston includes a boss projecting from a side of the piston opposite the thrust ring, wherein the spring element encircles the boss, and wherein the threaded hole is located in the boss.

4. The rolling bearing according to claim 1, further comprising at least one row of radial rolling elements arranged between the first and second rings.

5. The rolling bearing according to claim 4, wherein the second ring comprises a protruding nose engaged into an annular groove of the first ring and having an axial surface delimiting a second raceway for the radial rolling elements.

6. The rolling bearing according to claim 5, wherein the at least one row of axial rolling elements comprises two rows of axial rolling elements, each of the two rows of axial rolling elements being disposed on axially opposite sides of the nose.

7. The rolling element bearing according to claim 1, wherein the spring element comprises a Belleville washer or a compression spring.

8. The rolling element bearing according to claim 1, wherein the at least one spring system comprises a plurality of spring systems disposed circumferentially around the at least one thrust ring.

9. The rolling element bearing according to claim 1, wherein the first ring includes a plurality of bores, each bore having an opening facing the at least one thrust ring and a first portion having a first diameter and a second portion having a second diameter less than the first diameter, wherein the at least one spring system comprises a plurality of spring systems, each of the spring systems being located in a respective one of the plurality of bores, wherein the piston of each spring system includes a head located in the first portion of the respective bore and a boss extending from the head into the second portion of the respective bore and wherein the spring element comprises a Belleville washer or a compression spring in the first portion of the bore mounted around the boss, and wherein the boss includes the threaded hole.

10. The rolling bearing according to claim 9, including a threaded fastener mounted in the threaded hole and extending out of the second portion of the bore.

11. The rolling bearing according to claim 1, wherein said spring system further comprises a threaded fastener extending into the threaded hole of the piston, a head of the threaded fastener being accessible from outside the first ring.

12. The rolling bearing according to claim 11, wherein, the head of the threaded fastener contacts an outer surface of the first ring.

13. A method comprising:

providing a rolling bearing according to claim 11, screwing the threaded fastener into the threaded hole to draw the piston away from the at least one row of axial rolling elements, and measuring an axial clearance of the rolling bearing.

14. The method according to claim 13, further comprising, after measuring the axial clearance, unscrewing the threaded fastener from the threaded hole until the spring element presses the thrust ring against the at least one row of axial rolling elements.

15. A rolling bearing comprising:

a first ring, a second ring, a row of axial rolling elements arranged between the first ring and the second ring, a thrust ring located axially between the axial rolling elements and the first ring, the thrust ring having a first surface forming a raceway for the axial rolling elements, a plurality of pistons, first biasing means for pressing the plurality of pistons against the thrust ring to hold the thrust ring against the axial rolling elements, and second biasing means for counteracting a force of the first biasing means.

16. The rolling bearing according to claim 15, wherein the first biasing means comprises a plurality of Belleville washers or compression springs and the second biasing means comprises a threaded fastener engaged in a threaded hole in the piston.

* * * * *